United States Patent Office
3,030,805
Patented Apr. 24, 1962

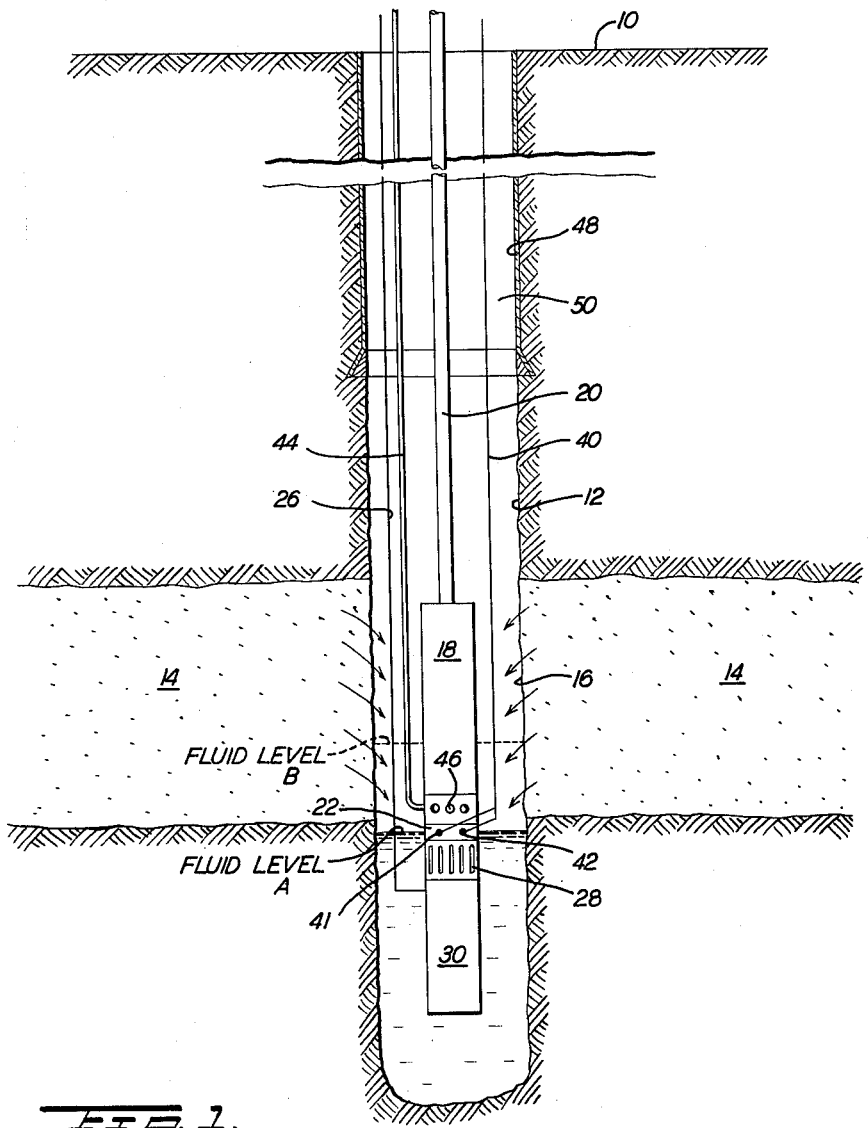

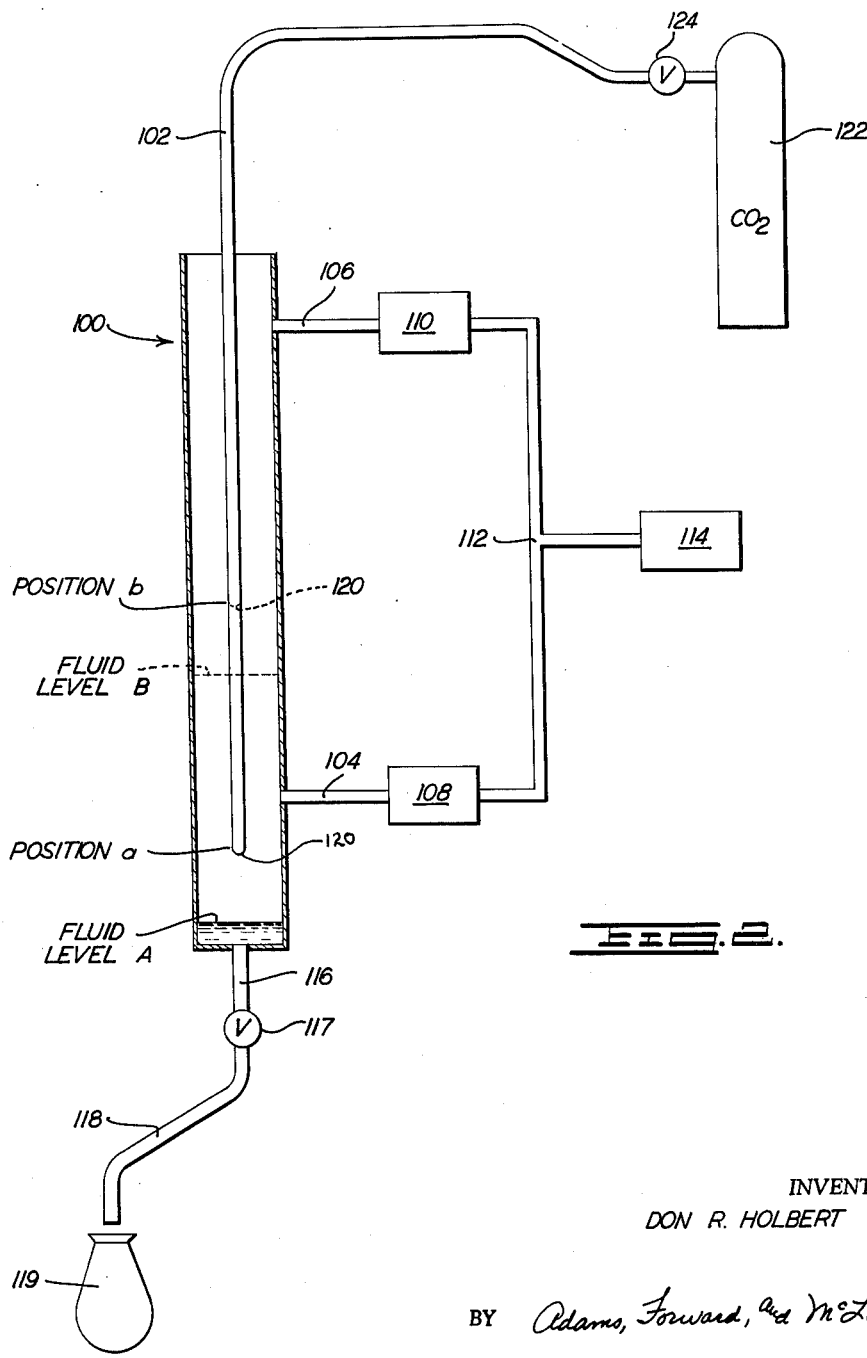

3,030,805
METHOD USING GAS MEANS TO PROFILE A SUBTERRANEAN OIL-BEARING FORMATION
Don R. Holbert, Tulsa, Okla., assignor to Sinclair Oil & Gas Company, Tulsa, Okla., a corporation of Maine
Filed July 7, 1959, Ser. No. 825,601
3 Claims. (Cl. 73—155)

The present invention relates to a method using gas means to profile a subterranean oil-bearing formation traversed by a production well. More particularly, the present invention is concerned with a method including the saturation of production liquids, flowing from subterranean formations, with gas at defined levels above a given liquid level in the well bore, recovering and measuring the gas content of liquid, produced from the formation, in which the gas is soluble. Through a progression of determinations of this type, a production well profile can be obtained. Knowledge of the "production profile" of subterranean oil-bearing formations is highly desirable for oil production purposes, for instance, to locate water producing zones which can be plugged to provide more efficient recovery of oil.

A suitable formation can be any sedimentary bed or stratum sufficient to be regarded as a unit. Fluids such as petroleum oil, gas, or water may be found distributed throughout the formation or only in intervals or zones of the formation. Although a formation may be substantially homogeneous in composition, formations do have random veins which vary in content. Intervals, zones, streaks or veins in the formation, alternatively or successively distributed, containing various fluids or different ratios of fluids are frequently encountered.

In most petroleum producing areas, the production of petroleum from subterranean oil producing formations is generally accompanied by the production of water or brine that may be present in random streaks, zones or intervals in the formation. Well effluents comprising as much as 90% water and only 10% oil are not uncommon. Pumping the water to the earth's surface and separating it from the oil is not only expensive but in many instances the problem of disposing the waste water is more than one of mere economics. Accordingly, if a production profile of a formation, i.e. information on the vertical distribution of liquids in a formation traversed by a producing well, were available to provide knowledge of the location of, and amounts of, unwanted extraneous materials, e.g. brine, ingressing into a production well, these locations could be sealed and the production of wanted materials, e.g. oil, could be more efficiently accomplished.

An object of the present invention is the provision of a method for determining the "production profile" of a subterranean formation traversed by a well bore. Another object of the present invention is the provision of a method for procuring information as an aid in determining the production profile of a well including the saturation of liquid, produced from the formation above a liquid level at a given vertical position, with gas and measuring the amounts of gas saturation for liquid, in which the gas is soluble, present in the production liquid recovered from the formation as an aid in the determination of the liquid production profile of the formation.

Another object of the present invention is the provision of a production well profiling method including the maintenance of a constant liquid level in the well bore adjacent to the formation to be profiled, introducing gas immediately above this level to saturate liquid entering the well above this level, recovering the liquid, measuring or determining the gas content of liquid recovered from the well in which liquid the gas is soluble and repeating this procedure at different liquid levels in the well until a progression of such measurements or determinations is obtained; the difference between the percentage of gas saturation of the liquid in which the gas is soluble at different levels being an indication of the production profile of a well.

The method of this invention can best be described with reference to an illustrative example and FIGURES 1 and 2 of the drawings.

Referring to the drawing, FIGURE 1, the numeral 10 represents the earth's surface through which a production well 12 with casing 48 has been drilled to formation 14 producing oil and water which fall into the well bore as indicated at the face 16 of the formation exposed in the well bore.

A submersible pump 18 along with a small diameter pipe string 20 and an electrical probe 22 is run into the well as shown in the drawing. Submersible pump 18, conveniently a centrifugal electrical pump which can pump a variable volume by a change of speed, includes electrical cable 26, pump intake portion 28, a pump motor defined at 30, and is employed initially to maintain fluid level A comprised of fluids, e.g. oil and brine, flowing from formation 14 by controlling the flow rate of the fluid pumped up string 20. Electrical probe 22 includes a multi conductor cable 40 for locating liquid level A by measuring current flow through the use of electrodes 41 and 42. By controlling the flow rate of liquid from the pump, liquid level A in the well is maintained at the electrode position.

Compressed gas soluble in at least one of the produced liquids, e.g. soluble in oil such as $CH_4$, or soluble in water, such as $CO_2$ or $O_2$, is then injected down the auxiliary pipe string 44 and jetted at a velocity great enough to saturate all falling liquid, out horizontally into the well bore just above the liquid level through gas jet 46 to cause liquids falling into the well bore above liquid level A to be thoroughly contacted with the gas. Where but one type of liquid, e.g. oil, is ingressing into the well bore, the compressed gas should be soluble in this particular liquid. Where more than one type of liquid is ingressing into the well bore, e.g. oil and water, the gas, if soluble in both types of liquids, would provide information on the combined amounts of oil and water entering at various levels in the well bore; however, if the gas is soluble in only one of the liquids, e.g. oil, specific information on the amount of oil entering at various levels in the formation would be provided and by substituting a gas which is only soluble in water for the oil soluble gas, specific information on the amount of water entering at various levels in the formation would be provided, and thus a highly useful production profile can be obtained. As the annulus 50 between the tubing and casing 12 is open, the undissolved gas can escape to the surface. A substantial portion or even all the liquid entering the well bore above the jets may be carried to the surface with the escaping gas. Therefore, it will be necessary to separate and meter the liquids trapped in the gas stream escaping from the annulus between the tubing and well casing at the surface. However, liquid coming into the well bore from above the jets is saturated with the gas.

The oil and water from formation 14 are pumped through tubing 20 to the surface and are separated and metered. The liquid in which the gas is soluble is then analyzed for gas content. The percentage of dissolved gas content to the possible dissolved gas content is a measure of the proportion of this liquid being produced above a given liquid level. In other words, by determining the relative saturation of the recovered liquids from the well, the amount of the solubilizing liquid entering the bore from above the liquid level can be determined. The percentage of gas saturation can be determined by known methods, for instance as illustrated in "Water Treatment for Industrial and Other Uses" by Estelle Nordell, Reinhold Publishing Co., N.Y., 1951, 2d printing, pages 98 and 99, wherein the Winkler method for determining the amount of oxygen dissolved in water is set forth. The percentage of saturation of the gas in the liquid is equivalent to the percentage of the liquid contacted with the gas. This, of course, is the percentage of liquid entering the well bore above the liquid level. The liquid level and jet position must then be changed, i.e. lowered or raised, for instance, to level B, and the process repeated. This will be continued until data from a sufficient number of different levels or stations is procured to complete the profile. As the process is repeated, it is preferable to maintain the same vertical relationship between the gas jet and the liquid level.

A laboratory test of the method of the present invention was conducted employing equipment illustrated in FIGURE 2. This equipment included Lucite cylinder 100, 4 inches in diameter and 4 feet in length, with conduit members 104 and 106, connecting flow control valves 108 and 110, respectively, each of which is connected to water line 112 receiving city water from source 114. Nipple opening 116, valve 117, line 118, and flask 119 provide means for maintaining the level of water, for instance, at level A or B, by manipulation of this valve to control liquid discharge thus maintaining the liquid level at either of the levels desired. Gas line 102 contains a gas nozzle or jet 120 and is connected to gas, i.e. $CO_2$, source 122 by way of valve 124.

With the gasifying tube at position $a$ and the liquid level at A, the $CO_2$ saturation of the effluent fluid from the simulated well bore was 30.5×8.3 p.p.m. Under these conditions 100% of the water flowing into the bore from 104 (40% of total $H_2O$) and 106 (60% of total $H_2O$) was contacted with saturating gas. The tube was then moved to position $b$ and level B. Under these conditions .76 g.p.m. fluid was gasified and .3 g.p.m. was not. Thus, about 60% of the fluid was contacted with gas. The $CO_2$ saturation of the effluent fluid was 18.8×8.3 and 19.5×8.3 p.p.m. This calculates at 61% fluid entering above the gasifying tube.

It is claimed:

1. A method for determining the production profile of a subterranean liquid producing formation traversed by a well bore and producing liquid, the steps comprising (a) maintaining a liquid level adjacent the formation and below production fluid ingressing into the well, (b) introducing gas soluble in production liquid above this level to saturate liquid entering the well bore above this level, (c) recovering the liquid from the well, and (d) measuring the gas saturation of recovered liquid, and repeating steps (a), (b), (c) and (d) at a different vertical liquid level adjacent the formation; the difference between the gas saturation of the liquid at the different levels being an indication of the production profile of the well as to the liquid in which the gas is soluble.

2. The method of claim 1 in which the formation is producing oil and water and the gas is water-soluble, oil-insoluble.

3. The method of claim 1 in which the formation is producing oil and water and the gas is oil-soluble, water-insoluble.

References Cited in the file of this patent
UNITED STATES PATENTS 2,528,956    Hayward                 Nov. 7, 1950
2,585,412    Silverman               Feb. 12, 1952